US011157416B2

(12) United States Patent
Cariello

(10) Patent No.: US 11,157,416 B2
(45) Date of Patent: Oct. 26, 2021

(54) FIRMWARE LOADING FOR A MEMORY CONTROLLER

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 16/803,682

(22) Filed: Feb. 27, 2020

(65) Prior Publication Data
US 2021/0271604 A1 Sep. 2, 2021

(51) Int. Cl.
| G06F 11/07 | (2006.01) |
|---|---|
| G06F 8/65 | (2018.01) |
| G06F 12/06 | (2006.01) |
| G06F 12/0882 | (2016.01) |
| G06F 12/0804 | (2016.01) |
| G06F 13/16 | (2006.01) |

(52) U.S. Cl.
CPC .......... *G06F 12/0882* (2013.01); *G06F 8/65* (2013.01); *G06F 11/0772* (2013.01); *G06F 12/0653* (2013.01); *G06F 12/0804* (2013.01); *G06F 13/1668* (2013.01); *G06F 2212/1024* (2013.01); *G06F 2212/7208* (2013.01)

(58) Field of Classification Search
CPC .... G06F 12/0882; G06F 8/65; G06F 11/0772; G06F 12/0653; G06F 12/0804; G06F 13/1668; G06F 9/445–44594; G06F 21/572; G06F 3/065; G06F 2212/7208; G06F 3/061
See application file for complete search history.

(56) References Cited

U.S. PATENT DOCUMENTS

| 2012/0096215 | A1* | 4/2012 | Zhang | G06F 12/0607 711/103 |
|---|---|---|---|---|
| 2012/0173953 | A1* | 7/2012 | Flynn | G06F 11/1004 714/758 |
| 2014/0331033 | A1* | 11/2014 | Liang | G06F 9/445 713/1 |
| 2021/0034352 | A1* | 2/2021 | Arrive | G06F 21/572 |

OTHER PUBLICATIONS

Cai, Yu, et al. "Error characterization, mitigation, and recovery in flash-memory-based solid-state drives." Proceedings of the IEEE 105.9 (Aug. 18, 2017): 1666-1704. (Year: 2017).*

* cited by examiner

*Primary Examiner* — Charles Rones
*Assistant Examiner* — Hewy H Li
(74) *Attorney, Agent, or Firm* — Holland & Hart LLP

(57) ABSTRACT

Methods, systems, and devices that support efficient upload of firmware from memory are described. Multiple copies of a set of firmware may be stored across multiple planes of a memory device, such as with one respective copy within each of a set of planes. The copies may be staggered or otherwise offset in terms of page locations within the respective planes such that like-addressed pages within different planes store different subsets of the set of firmware. A controller may concurrently retrieve different subsets of the set of firmware, each of the different subsets included in a different copy, by concurrently retrieving the subsets stored at like-addressed pages within different memory planes. Upon loading the firmware code, the controller execute the firmware code to perform one or more further operations.

25 Claims, 8 Drawing Sheets

FIRMWARE LOADING FOR A MEMORY CONTROLLER

BACKGROUND

The following relates generally to a system that includes at least one memory device and more specifically to firmware loading for a memory controller.

A system may include various kinds of memory devices and controllers that are coupled via one or more buses to manage information in numerous electronic devices such as computers, wireless communication devices, internet of things, cameras, digital displays, and the like. Memory devices are widely used to store information in such electronic devices. Information is stored by programing different states of a memory cell. For example, binary memory cells may store one of two states, often denoted by a logic "1" or a logic "0." Some memory cells are capable of storing one of more than two states. To access the stored information, the memory device may read, or sense, the stored state in the memory cell. To store information, the memory device may write, or program, the state to the memory cell.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), Flash memory (such as floating-gate Flash and charge-trapping Flash, which may be used in not-or (NOR) or not-and (NAND) memory devices), and others. Memory devices may be volatile or non-volatile. Non-volatile memory cells, e.g., such as Flash memory cells, may maintain their stored logic state for extended periods of time even in the absence of an external power source. Volatile memory cells, e.g., DRAM cells, may lose their stored state over time unless they are periodically refreshed by an external power source. Flash-based memory devices may have improved performance compared to some non-volatile and volatile memory devices.

DETAILED DESCRIPTION

In some cases, the start-up (or "boot-up" or "reboot") procedure for a memory device may involve retrieving firmware from memory so that the firmware can be executed by a controller of the memory device. But for some memory devices, retrieving the firmware from memory may be slow, which may increase the latency of the start-up procedure for the memory device. For example, a memory device may be limited to reading one page of firmware code at a time due to shared read circuitry, which may increase latency when retrieving the firmware code as part of the start-up procedure.

According to the techniques described herein, a memory device may be operable to reduce start-up latency by concurrently reading multiple pages of firmware code. For example, the memory device may be configured to store multiple copies of the firmware in a staggered pattern that allows the memory device to read multiple pages of firmware code in parallel, even if the memory device has shared read circuitry. The device may repeatedly read multiple pages of firmware code in parallel until the firmware is completely loaded or an error is encountered. If an error is encountered, the device may reduce the number of pages it reads in parallel or switch to a serial retrieval method in which the firmware code is read from a single page at a time. Although described with reference to firmware, the loading techniques described herein may be used for any type of stored data.

Features of the disclosure are initially described in the context of a memory device and memory circuit as described with reference to FIGS. 1 and 2. These and other features of the disclosure are further illustrated by and described with reference to system diagrams, process flows, and flowcharts that relate to efficient firmware loading as described with references to FIGS. 3-8.

Figure 1:
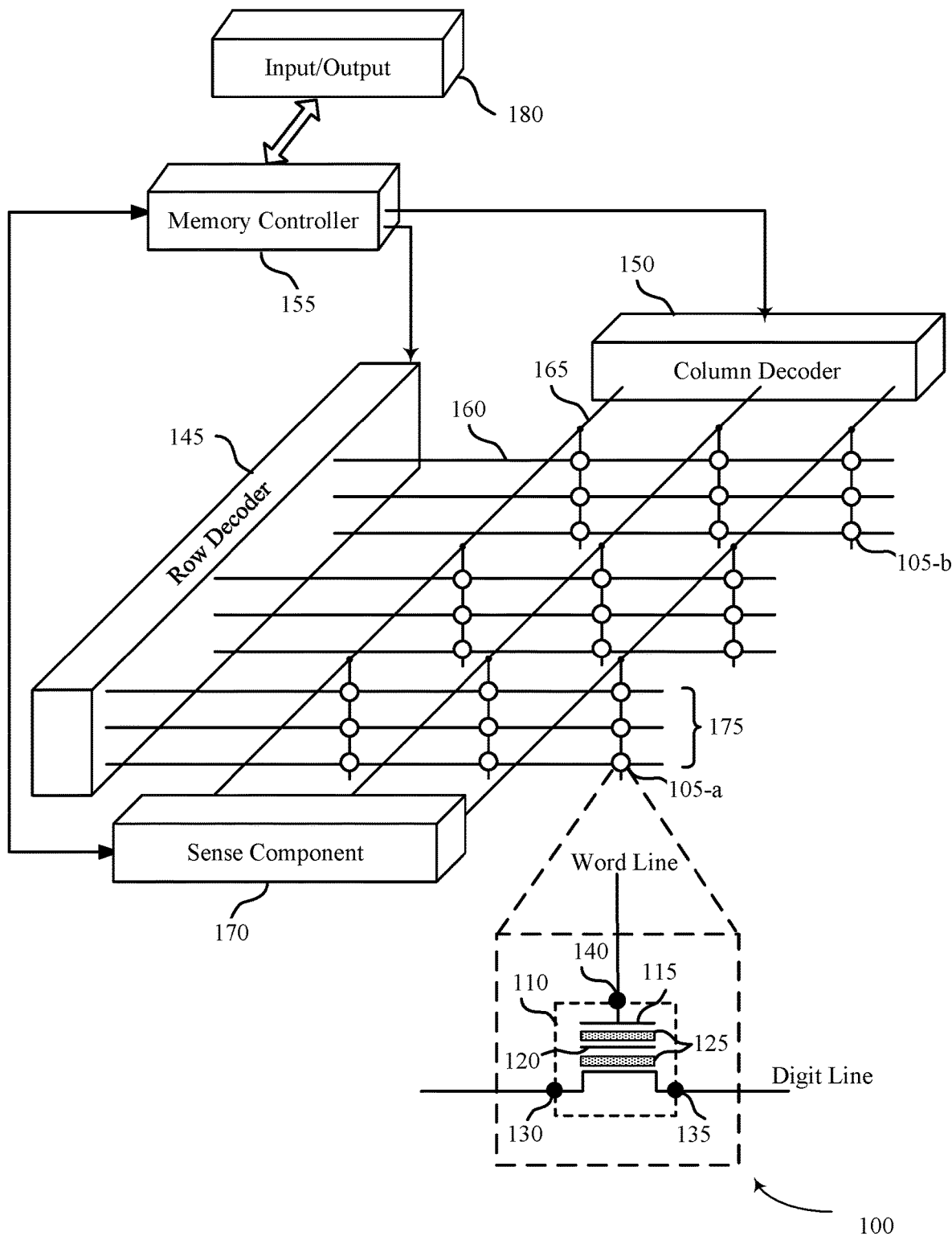
FIG. 1 illustrates an example of a memory device that supports firmware loading for a memory controller in accordance with examples as disclosed herein.

FIG. 1 illustrates an example of a memory device 100 in accordance with examples as disclosed herein. In some cases, the memory device 100 may be referred to as a memory chip, a memory die, or an electronic memory apparatus. The memory device 100 may include one or more memory cells, such as memory cell 105-a and memory cell 105-b (other memory cells are unlabeled). A memory cell 105 may be, for example, a Flash or other type of NAND memory cell (such as in the blow-up diagram of memory cell 105-a shown in FIG. 1), a DRAM memory cell, an FeRAM memory cell, a PCM memory cell, or another type of memory cell.

Each memory cell 105 may be programmed to store a logic state representing one or more bits of information. In some cases, a memory cell 105 may store one bit of information at a time (e.g., a logic state 0 or a logic state 1), such as in the memory cells of SLC memory blocks, which may be referred to as SLC memory cells. In some cases, a single memory cell 105 may store more than one bit of information at a time, such as in the memory cells of MLC, TLC, or QLC memory blocks. For example, a single memory cell 105 in an MLC memory block (e.g., an MLC memory cell) may be store two bits of information at a time by storing one of four logic states: logic state 00, logic state 01, logic state 10, or a logic state 11. For example, a single memory cell 105 in a TLC memory block (e.g., a TLC memory cell) may store three bits of information at a time by storing one of eight logic states: 000, 001, 010, 011, 100, 101, 110, 111.

In some cases, a multiple-level memory cell 105 (e.g., an MLC memory cell, TLC memory cell, or QLC memory cell) may be physically different than an SLC cell. For example, a multiple-level memory cell 105 may use a different cell geometry or be fabricated using different materials. In some cases, a multiple-level memory cell 105 may be physically the same or similar to an SLC cell, and other circuitry in a memory block (such as controller circuitry, sense amplifiers, drivers, etc.) may be configured to operate (e.g., read and write) the memory cell as an SLC cell, an MLC cell, a TLC cell, etc.

Different memory cell architectures may store a logic state in different ways. In FeRAM architectures, for example, each memory cell 105 may include a capacitor that includes a ferroelectric material to store a charge and/or a polarization representative of the programmable state. In DRAM architectures, each memory cell 105 may include a capacitor that includes a dielectric material (e.g., an insulator) to store a charge representative of the programmable state.

In Flash memory architectures, each memory cell 105 may include a transistor that has a floating gate and/or a dielectric material for storing a charge representative of the logic state. For example, the blow-up diagram of memory cell 105-a in FIG. 1 is a Flash memory cell that includes a transistor 110 (e.g., a metal-oxide-semiconductor (MOS) transistor) that may be used to store a logic state. The transistor 110 has a control gate 115 and may include a floating gate 120 that is sandwiched between dielectric material 125. Transistor 110 includes a first node 130 (e.g., a source or drain) and a second node 135 (e.g., a drain or source). A logic state may be stored in transistor 110 by placing (e.g., writing, storing) a quantity of electrons (e.g., a charge) on floating gate 120. The amount of charge to be stored on the floating gate 120 may depend on the logic state to be stored. The charge stored on floating gate 120 may affect the threshold voltage of transistor 110, thereby affecting the amount of current that flows through transistor 110 when transistor 110 is activated. The logic state stored in transistor 110 may be read by applying a voltage to the control gate 115 (e.g., at control node 140) to activate transistor 110 and measuring (e.g., detecting, sensing) the resulting amount of current that flows between the first node 130 and the second node 135.

For example, a sense component 170 may determine whether an SLC memory cell stores a logic state 0 or a logic state 1 in a binary manner; e.g., based on the presence or absence of a current from the memory cell, or based on whether the current is above or below a threshold current. For multiple-level cells, however, a sense component 170 may determine the logic state stored in the memory cell based on various intermediate levels of current. For example, a sense component 170 may determine the logic state of a TLC cell based on eight different levels of current (or ranges of current) that define the eight potential logic states that could be stored by the TLC cell. Such levels of current may be fairly closely spaced (in terms of magnitude), providing a lower margin for error than in the SLC case.

Similarly, a Flash SLC memory cell may be written by applying one of two voltages (e.g., a voltage above a threshold or a voltage below a threshold) to the memory cell to store (or not store) an electric charge on the floating gate representing one of the two possible logic states. In contrast, writing to a Flash multiple-level cell may require applying voltages at a finer level of granularity to more finely control the amount of charge stored on the floating gate, thereby enabling a larger set of logic states to be represented. Thus, multiple-level cells may be more sensitive to voltage or current variations that may occur in a memory device due to temperature variations or other operating conditions.

A charge-trapping Flash memory cell may operate in a manner similar to that of a floating-gate Flash memory cell, but instead of (or in addition to) storing a charge on a floating gate 120, a charge-trapping Flash memory cell may store a charge representing the state in a dielectric material below the control gate 115. Thus, a charge-trapping Flash memory cell may or may not include a floating gate 120.

In some examples, each row of memory cells 105 is connected to a word line 160 and each column of memory cells 105 is connected to a digit line 165. Thus, one memory cell 105 may be located at the intersection of a word line 160 and a digit line 165. This intersection may be referred to as a memory cell's address. Digit lines are sometimes referred to as bit lines. In some cases, word lines 160 and digit lines 165 may be substantially perpendicular to one another and may create an array of memory cells 105. In some cases, word lines 160 and digit lines 165 may be generically referred to as access lines or select lines.

In some cases, memory device 100 may include a three-dimensional (3D) memory array, where multiple two-dimensional (2D) memory arrays are formed on top of one another. This may increase the quantity of memory cells that may be placed or created on a single die or substrate as compared with 2D arrays, which in turn may reduce production costs, or increase the performance of the memory array, or both. In the example of FIG. 1, memory device 100 includes multiple levels of memory arrays. The levels may, in some examples, be separated by an electrically insulating material. Each level may be aligned or positioned so that memory cells 105 may be aligned (exactly, overlapping, or approximately) with one another across each level, forming memory cell stack 175. In some cases, memory cell stack 175 may be referred to as a string of memory cells, discussed in more detail with reference to FIG. 2.

Accessing memory cells 105 may be controlled through row decoder 145 and column decoder 150. For example, row decoder 145 may receive a row address from memory controller 155 and activate an appropriate word line 160 based on the received row address. Similarly, column decoder 150 may receive a column address from memory controller 155 and activate an appropriate digit line 165. Thus, by activating one word line 160 and one digit line 165, one memory cell 105 may be accessed.

Upon accessing, memory cell 105 may be read, or sensed, by sense component 170. For example, sense component 170 may be configured to determine the stored logic state of memory cell 105 based on a signal generated by accessing memory cell 105. The signal may include a voltage or electrical current, or both, and sense component 170 may include voltage sense amplifiers, current sense amplifiers, or both. For example, a current or voltage may be applied to a memory cell 105 (using the corresponding word line 160 and/or digit line 165) and the magnitude of the resulting current or voltage on the digit line 165 may depend on the logic state stored by the memory cell 105. For example, for a Flash memory cell, the amount of charge stored on a floating gate or in an insulating layer of a transistor in the memory cell 105 may affect the threshold voltage of the transistor, thereby affecting the amount of current that flows through the transistor in the memory cell 105 when the memory cell 105 is accessed. Such differences in current may be used to determine the logic state stored on the memory cell 105.

Sense component 170 may include various transistors or amplifiers in order to detect and amplify a signal (e.g., a current or voltage) on a digit line 165. The detected logic state of memory cell 105 may then be output via input/output block 180. In some cases, sense component 170 may be a part of column decoder 150 or row decoder 145, or sense component 170 may otherwise be connected to or in electronic communication with column decoder 150 or row decoder 145.

A memory cell 105 may be set or written by similarly activating the relevant word line 160 and digit line 165 to enable a logic state (e.g., representing one or more bits of information) to be stored in the memory cell 105. Column decoder 150 or row decoder 145 may accept data, for example from input/output block 180, to be written to the memory cells 105. As previously discussed, in the case of Flash memory (such as Flash memory used in NAND and 3D NAND memory devices) a memory cell 105 is written by storing electrons in a floating gate or an insulating layer.

Memory controller 155 may control the operation (e.g., read, write, re-write, refresh) of memory cells 105 through the various components, for example, row decoder 145, column decoder 150, and sense component 170. In some cases, one or more of row decoder 145, column decoder 150, and sense component 170 may be co-located with memory controller 155. Memory controller 155 may generate row and column address signals in order to activate the desired word line 160 and digit line 165. Memory controller 155 may also generate and control various voltages or currents used during the operation of memory device 100.

In some examples, the memory controller 155 may retrieve firmware code (or "firmware," "firmware data") from a set of memory cells 105 as part of a start-up procedure. The firmware code may be low-level code (e.g., operating code) that enables the memory controller 155 to subsequently perform higher-level functions using more complex software. Multiple copies of the firmware code may be stored within memory device 100, which may provide redundancy and increased reliability, among other benefits. In some cases, memory device 100 may be capable of concurrently reading different pages of memory cells 105 from different planes, but only if the pages have matching page addresses within their respective planes (e.g., due to aspects of read circuitry being shared between planes). Because loading a complete copy of the firmware code may be a prerequisite for full functionality, latency in retrieving the firmware code may negatively impact the performance of memory device 100 and user experience. According to the techniques described herein, a memory device 100 may reduce firmware retrieval latency by storing the firmware in a pattern that allows the memory device 100 to concurrently read subsets of a complete copy of the firmware code from multiple pages in multiple planes.

Figure 2:
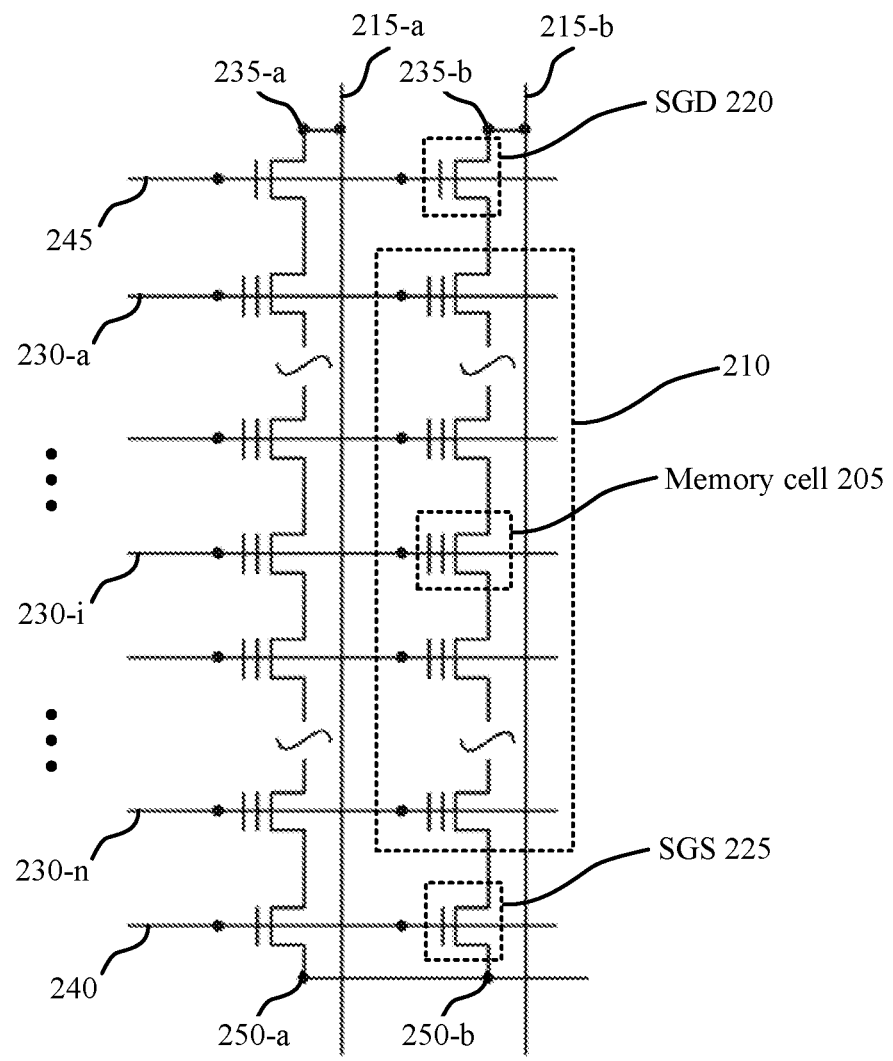
FIG. 2 illustrates an example of a NAND memory circuit that supports firmware loading for a memory controller in accordance with examples as disclosed herein.

FIG. 2 illustrates an example of NAND memory circuit 200 that supports firmware loading for a memory controller in accordance with examples of the present disclosure. NAND memory circuit 200 may be an example of a portion of a memory device, such as memory device 100. Although some elements included in FIG. 2 are labeled with reference numbers, other corresponding elements are not labeled, though they are the same or would be understood to be similar, in an effort to increase visibility and clarity of the depicted features.

NAND memory circuit 200 includes multiple Flash memory cells 205 (which may be, for example, Flash memory cells such as described with reference to FIG. 1) connected in a NAND configuration. In a NAND memory configuration (referred to as NAND memory), multiple Flash memory cells 205 are connected in series with each other to form strings 210 of memory cells 205, in which the drain of each Flash memory cell 205 in the string 210 is coupled with the source of another Flash memory cell 205 in the string. In some cases, Flash memory cells that are connected in a NAND configuration to form a NAND memory may be referred to as NAND memory cells.

Each string 210 of memory cells 205 may be associated with a corresponding digit line 215 that is shared by the memory cells 205 in the string 210. Each memory cell 205 in a string 210 may be associated with a separate word line 230 (e.g., word line 230-a, 230-i, 230-n), such that the quantity of word lines 230 may be equal to the quantity of memory cells 205 in a string 210.

In general, NAND memory may be hierarchically organized as strings 210 that include multiple memory cells 205, pages that include multiple strings 210, and blocks that include multiple pages. In some cases, NAND memory can be written to and read from at the page level of granularity, but may not be erasable at the page level of granularity. For example, NAND memory may instead be erasable at a higher level of granularity, such as at the block level of granularity. In some cases, a NAND memory cell may need to be erased before it can be re-written. Different memory devices may have different read/write/erase characteristics.

Each string 210 of memory cells 205 in NAND memory circuit 200 is coupled with a select gate device for drain (SGD) transistor 220 at one end of the string 210 and a select gate device for source (SGS) transistor 225 at the other end of the string 210. SGD transistor 220 and SGS transistor 225 may be used to couple a string 210 of memory cells 205 to a bit line 215 and/or to a source node 250 by applying a voltage at the gate 245 of SGD transistor 225 and/or at the gate 240 of SGS transistor 225, respectively.

During NAND memory operations, various voltage levels associated with source node 250, gate 240 of an SGS transistor 225 associated with source node 250, word lines 230, drain node 235, gate 245 of an SGD transistor 220 associated with drain node 235, and bit line 215 may be applied to perform one or more operations (e.g., program, erase, or read) on at least some NAND memory cells in a string 210.

In some cases, during a first operation (e.g., a read operation), a positive voltage may be applied to bit line 215 connected to drain node 235 whereas source node 250 may be connected to a ground or a virtual ground (e.g., approximately 0 V). For example, the voltage applied to drain node 235 may be 1 V. Concurrently, voltages applied to gates 245 and 240 may be increased above the threshold voltages of the one or more SGSs 225 associated with source node 250 and the one or more SGDs 220 associated with drain node 235, such that a channel associated with memory string 210 may be electrically connected to drain node 235 and source node 250. A channel may be an electrical path through the memory cells 205 in a string 210 (e.g., through the transistors in the memory cells 205) that may conduct current under certain operating conditions.

Concurrently, multiple word lines 160 (e.g., in some cases all word lines 160) except a selected word line (i.e., word lines associated with unselected cells in string 210) may be connected to a voltage (e.g., VREAD) that is higher than the highest threshold voltage (VT) of memory cells in string 210. VREAD may cause all of the unselected memory cells in string 210 to turn "ON" so that each unselected memory cell can maintain high conductivity in a channel associated with it. In some examples, a word line 160 associated with a selected cell may be connected to a voltage, VTarget. VTarget may be selected at a value between VT of an erased memory cell and VT of a programmed memory cell in memory string 210. When the selected memory cell exhibits an erased VT (e.g., VTarget>VT of the selected memory cell), the selected memory cell 205 may turn "ON" in response to the application of VTarget and thus allow a current to flow in the channel of memory string 210 from bit line 215 to source 250. When the selected memory cell exhibits a programmed VT (e.g., hence VTarget<VT of the selected memory cell), the selected memory cell may turn "OFF" in response to VTarget and thus prohibit a current to flow in the channel of memory string 210 from bit line 215 to source 250. The amount of current flow (or lack thereof), may be sensed by sense component 170 as described with reference to FIG. 1 to read stored information in the selected memory cell 205 within string 210.

In some cases, the NAND memory cells 205 may be used to store firmware code. In such cases, the memory device that includes the memory cells 205 may be configured to read the firmware code from multiple pages in parallel to increase the efficiency of a start-up procedure for the memory device.

Figure 3:
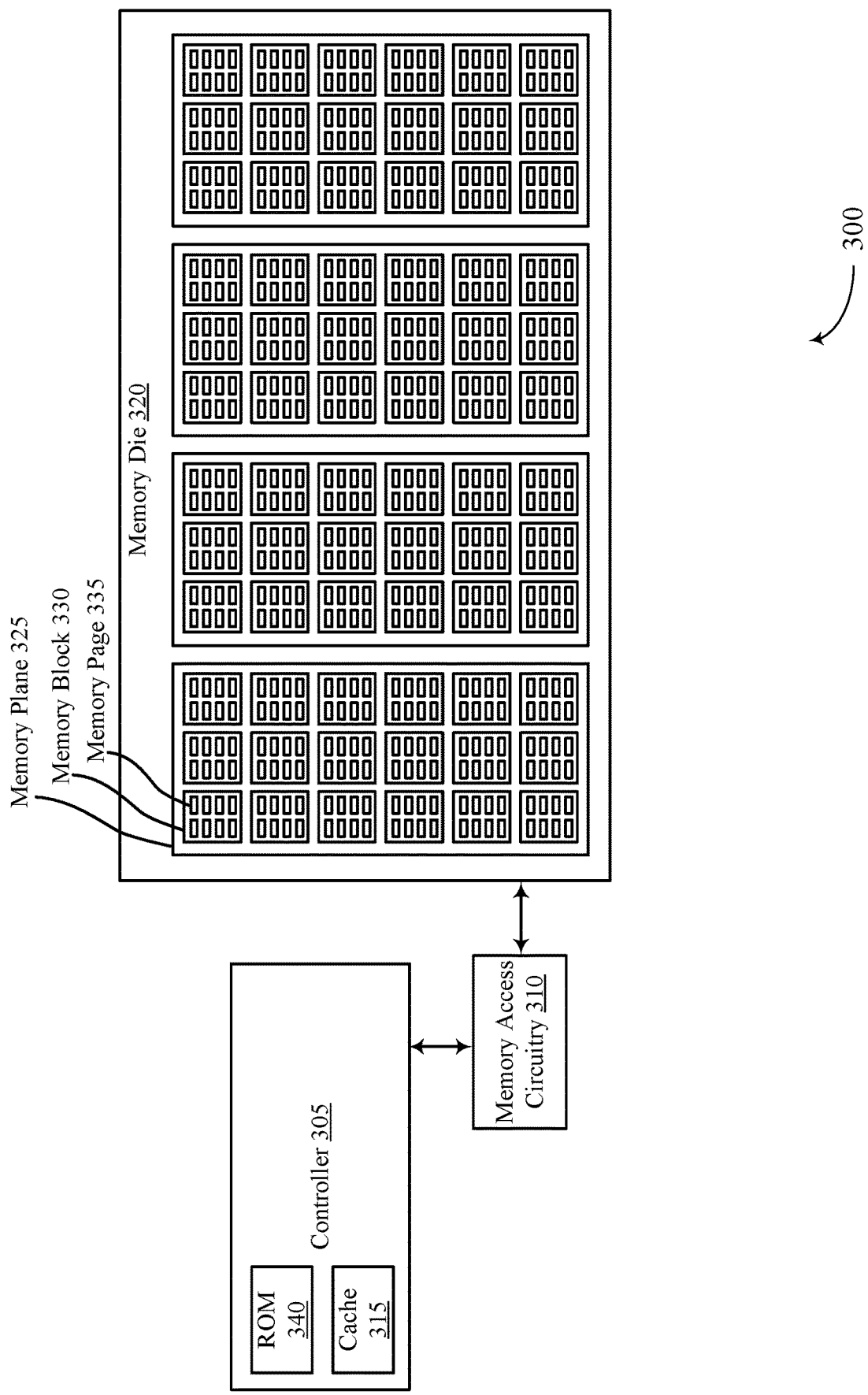
FIG. 3 illustrates an example of a memory device that supports firmware loading for a memory controller in accordance with examples as disclosed herein.

FIG. 3 illustrates an example of a memory device 300 that supports firmware loading for a memory controller in accordance with examples as disclosed herein. Memory device 300 may be an example of a memory device 100 as described with reference to FIG. 1 and may include aspects of a NAND memory circuit 200 as described with reference to FIG. 2. Memory device 300 may be configured to efficiently retrieve firmware by concurrently reading firmware code from multiple pages across different memory planes.

Memory device 300 may include controller 305, which may be an example of a memory controller 155 described with reference to FIG. 1. Memory device 300 may also include memory access circuitry 310, which may include circuitry for performing read, write, and erase operations on memory cells in memory device 300. In some examples, memory access circuitry 310 includes an address bus and/or one or more address decoders, which may include aspects of a column decoder 150 and/or row decoder 145 as described with reference to FIG. 1. The controller 305 and memory access circuitry 310 may be coupled with each other so that electronic signals (e.g., commands, data, etc.) can be exchanged between the two components.

The controller 305 may include or be coupled with various memories, including read-only memory (ROM) 340, memory cache 315, and memory die 320. In some cases, memory cache 315 may include a different type of memory than ROM 340, such as static random access memory (SRAM). The ROM 340 may store instructions (e.g., code) that is executable by the controller 305 to cause the memory device 300 to find firmware code stored in die 320 so that the firmware code can be loaded into memory cache 315. In some examples, the die 320 includes non-volatile memory cells, such as NAND memory cells, which allows the firmware to be preserved even in the absence of power. Upon loading the firmware into memory cache 315, controller 305 may execute the firmware to cause the memory device 300 to perform various operations.

Although shown with a single memory die 320 for the sake of clarity, memory device 300 may in some cases include multiple memory dies 320, and each memory die 320 may be configured to independently execute commands or report status. In some cases, there may be independent operation registers, status indication signals, and/or external signal lines shared within memory dies 320. A memory die 320 may include (e.g., be logically divided into) one or more memory planes 325, which may share one or more operation registers so that memory device 300 can perform concurrent (e.g., identical) operations on multiple planes 325. However, each memory plane 325 may in some cases have an independent data register group so that data for that memory plane 325 can be differentiated from data for other memory planes 325. Within each memory plane 325 there may be one or more memory blocks 330, which in some cases may be the smallest memory unit that can be independently erased. A memory block 330 may include one or more memory pages 335, which may be the smallest memory unit that can be independently read/written. Each memory page 335 may include a plurality of memory cells, such as memory cells 205 as described with reference to FIG. 2.

Memory access circuitry 310 may be coupled with memory die 320 and operable to perform access operations, such as read, erase, and write operations, on memory cells within memory die 320 (e.g., at a page or block level). Memory access circuitry 310 may include address circuitry that enables memory access circuitry 310 to read, erase, or write to a particular section of memory die 320.

But in some cases, the memory access circuitry 310 may configured so that memory device 300 is subject to one or more address limitations. For example, the memory access circuitry 310 may be configured so that an access operation on a first page within a first memory plane 325 (or memory block 330) and an access operation on a second page within a second memory plane 325 (or memory block 330) may not be performed concurrently unless the first page and the second page having the same (matching, identical, equal) page address within their respective planes 325. For instance, the page address circuitry (e.g., an address bus and/or decoder) for two memory planes may be shared, meaning that an access operation performed on the two memory planes targets the same page address within those memory planes 325. An address limitation such as this may increase the latency for starting-up memory device 300, particularly if multiple copies of firmware are stored in a uniform pattern across memory planes 325. Techniques for reducing start-up latency for a memory device 300 subject to page address-limitations are described herein. Further, it is to be understood that techniques as described herein may be applied in the context of any type of memory, and in the context of any type of hierarchical memory structure in which address-related limitations related to concurrently accessing memory entities at the same hierarchical level may exist.

Figure 4:
FIG. 4 illustrates an example of firmware layouts that support firmware loading for a memory controller in accordance with examples as disclosed herein.

FIG. 4 illustrates examples of alternative firmware layouts 400-a and 400-b that support firmware loading for a memory controller in accordance with examples as disclosed herein. Each firmware layout 400 shows the organization of content stored in the memory planes 405 of a memory device as described herein. Firmware layout 400-a may support an example serial retrieval method for loading firmware and firmware layout 400-b may support an example parallel retrieval method that may be used as an alternative or in addition to the serial retrieval method (e.g., a serial retrieval method may be used as a fallback should an error or other issue arise with respect to a parallel retrieval method).

In some examples, the memory planes 405 for a given firmware layout 400 may all be disposed on the same memory die. Further, each memory plane 405 may include a plurality of pages and each page may be associated with a page address. In each firmware layout 400, the page address scheme may be the same within each memory plane. In some examples, the page addresses in each memory plane may be sequentially numbered (e.g., numbered from 0 to N−1 where N is the quantity of pages in the memory plane). In such cases, the pages in a memory plane may be referred to as being sequentially addressed. Although each memory plane may have a page associated with a page address x, each page may also be associated with a unique block address or plane address so that the page can be differentiated from other pages (e.g., in different blocks and/or planes) with page address x.

For functionality and reliability reasons a memory device may store multiple copies (e.g., identical copies) of firmware code. For example, storing multiple copies of firmware may allow the memory device to revert to an old version of the firmware if an update for one of the copies is interrupted. Or the memory device may use a back-up copy of the firmware if one copy becomes corrupted over time. The complete firmware code for a memory device may be referred to herein as a set of firmware code, and duplicates of the set of firmware code may be referred to as copies.

In some examples, different memory planes may store respective copies of firmware. For example, a first memory plane (e.g., plane 0) may store a first copy of firmware, a second memory plane (e.g., plane 1) may store a second copy of the firmware, a third plane (e.g., plane 2) may store a third copy of the firmware, and a fourth plane (e.g., plane 3) may store a fourth copy of the firmware. Such a storage technique is illustrated in firmware layout 400-a and firmware layout 400-b, each of which shows four planes 405 storing respective copies of a set of firmware that is made up of 62 subsets of firmware code.

In some examples, a subset of firmware code (e.g., the firmware code stored at a page) may be also referred to as a "chunk." Thus, a page may store a "chunk" or "subset" of a set of firmware code. A page that does not store firmware code may be programmed with random data (denoted "random"). In some examples, the pages in a plane may be configured to store not only firmware code but also parity data and metadata. For example, a page may include one or more memory cells that store firmware code 410, one or more memory cells that store parity data 415, and one or more memory cells that store metadata 420. The metadata for a page may be used to increase reliability of a firmware retrieval method as described below.

In firmware layout 400-a, a first copy of the firmware is stored in pages 1 through 62 within memory plane 0, a second copy of the firmware is stored in pages 1 through 62 within memory plane 1, a third copy of the firmware is stored in pages 1 through 62 within memory plane 2, and a fourth copy of the firmware is stored in pages 1 through 62 within memory plane 3. In this layout, corresponding subsets of firmware code across the copies are stored at pages that have the same page addresses (but are within different planes, and thus have different memory plane addresses). For example, page 1 within plane 0 may store subset 0 of the first copy, page 1 within plane 1 may store subset 0 of the second copy, page 1 within plane 2 may store subset 0 of the third copy, and page 1 within plane 3 may store subset 0 of the fourth copy. Two or more subsets of firmware code may be corresponding if they comprise the same data (e.g., are copies of the same subset of firmware).

A memory device that uses firmware layout 400-a may load a copy of the firmware into a memory cache by performing a serial retrieval method in which subsets of firmware code are serially read from successive pages (in some cases, sequentially addressed pages) within a single memory plane 405. For example, the memory device may read the first subset of firmware code (e.g., subset 0) from page 1 within memory plane 0, then read the second subset of firmware code (e.g., subset 1) from page 2 within memory plane 0, and so on and so forth until the last subset of firmware code (e.g., subset 61) is read from page 62 within plane 0.

Some memory devices using firmware layout 400-a may be prevented from reading multiple subsets of firmware code at time (e.g., in parallel) due to shared page address circuitry. For example, a memory device may be unable to read firmware code subset 0 from plane 0 concurrently with reading firmware code subset 1 from plane 1 because the memory device is only able to concurrently address a single page address at a time, even across memory planes. Put another way, the read circuitry of the memory device may limit the device to concurrently accessing pages having the same page address in different memory planes (e.g., the memory device may be able to concurrently access page 4 in plane 0 and page 4 in plane 1, but may be unable to access page 4 in plane 0 and page 5 in plane 1). Such a restriction may increase the latency of performing a start-up procedure for the device if a layout such as layout 400-a is used because the subsets of firmware code may in such cases be read one at time (e.g., serially). In some examples, a memory device implementing the serial retrieval method may be referred to as operating in single plane mode.

To increase retrieval efficiency, a memory device may implement a layout such as firmware layout 400-b, which may allow the memory device to read firmware code from multiple pages in parallel despite addressing limitations. The terms "concurrent" or "in parallel" may refer to a temporal relationship in which one action (e.g., a read operation) occurs at the same time as another action, at substantially the same time as the other action, or during partially overlapping times. Firmware layout 400-b may enable concurrent reading of multiple subsets of firmware code by staggering the page address of the pages used to store a given subset of firmware code for different copies. For example, page 4 may store the first subset (e.g., subset 0) of firmware code for the copy in plane 0, whereas page 3 may store the first subset (e.g., subset 0) of firmware code for the copy in plane 1. And so on and so forth. By storing like subsets of different copies of the firmware code in pages having offset (different) page addresses, the memory device may enable a parallel retrieval method in which different subsets of firmware code are read concurrently from pages within different memory planes. In some examples, a memory device implementing the parallel retrieval method may be referred to as operating in multi-plane mode.

As an example of the parallel retrieval method, the following read operations may be performed concurrently: a first read operation to read a first subset of firmware code (e.g., set 0) from page 4 in plane 0, a second read operation to read a second subset of firmware code (e.g., set 1) from page 4 in plane 1, a third read operation to read a third subset of firmware code (e.g., set 2) from page 4 in plane 2, and a fourth read operation to read a fourth subset of firmware code (e.g., set 3) from page 4 in plane 3. Thus, four subsets of firmware code may be read concurrently (e.g., in parallel, at least partially overlapping in time) in the time it may take to read one subset of firmware code when using a serial retrieval method. A set of parallel (concurrently performed) read operations—and thus a group of concurrently read subsets of firmware code read—may be represented in FIG. 4 by a hollow arrow and the subsets therein.

A memory device may continue to use the parallel retrieval method by performing concurrent read operations on same-addressed pages within different memory planes until a complete copy of the firmware is loaded into the memory cache. However, unlike in the serial retrieval method, the memory device may skip reading from one or more page addresses due to the staggered pattern of firmware layout 400-b. For example, after reading from each page 4 across all planes 405-b, the memory device may next read from each page 8 across all planes 405-b. In the given example, the final page address targeted for a read operation may be the page address for page 62 because the last subset of firmware code for the firmware (e.g., subset 61) is stored at that address in memory plane 3. Thus, a complete collection of the firmware may be loaded (built) in the memory cache using subsets of firmware code from different copies of the firmware, the different copies stored in different respective memory planes.

In some cases, a memory device may update its firmware. For example the memory device may perform a field firmware update (FFU) in which a new version of firmware replaces an older version of the firmware. During the FFU, the memory device may replace one copy of the firmware at a time. For example, the memory device may completely update the first copy of the firmware stored at plane 0 before beginning to update the other copies of firmware stored at the other memory planes. To update the firmware in a memory plane, the memory device may write over or otherwise replace (e.g., through any combination of erase and program operations) each subset of firmware code, for example in sequential order starting with the beginning page address (e.g., page 4 for memory plane 0). The beginning page address for each memory plane may be different. For example, the page address for page 4 may be the beginning address for memory plane 0, the page address for page 3 may be the beginning address for memory plane 1, the page address for page 2 may be the beginning address for memory plane 2, and the page address for page 1 may be the beginning address for memory plane 3. In some examples, the memory device may erase the content at a page address before updating the subset of firmware stored there. For instance, the memory device may erase the content of the memory block that includes the page before writing a new version of the firmware code to that page.

A memory device may locate the beginning address for a memory plane by referencing the starting code (STC), which may be at a known address (e.g., an address stored in ROM). For example, the memory device may execute ROM code to search for, find, and load the starting code. The starting code may be a routine (e.g., firmware with minimal functionality) that includes information about the NAND memory (or other type of memory) storing the firmware. For example, the starting code may indicate the geometry of the NAND memory, the number of planes in the NAND memory, the number of NAND dies in the memory device, etc. The starting code may also indicate the layout 400 of the NAND memory, including the beginning page address for the copy of firmware stored in each memory plane. After the memory device recognizes the starting code, the memory device may pass control to the starting code (e.g., load and execute it) so that the rest of the pages can be read to obtain the firmware code. Thus, use of a starting code may enable the memory device to dynamically change the NAND layout without changing the ROM. However, a memory device may avoid use of starting code by implementing a work-around (e.g., using fuses to inform the ROM of changes to the NAND layout).

In some cases, a memory device performing a firmware update may be interrupted mid-update and prevented from finishing the update. As just one example, the memory device may be updating the firmware in plane 3 when power is lost. In such a scenario, a portion of the firmware in plane 3 may be updated while the rest remains un-updated. Thus, at least a portion of the firmware in plane 3 will be inconsistent with the firmware in planes 0, 1, and/or 2, depending on the version of firmware stored in those planes. If a memory device using the parallel retrieval method fails to detect that the firmware versions across planes are different, the memory device may attempt to load and execute different versions of firmware, which may increase the likelihood of a system crash.

In some cases, to address this potential issue, each page may store a flag (e.g., as part of metadata 420) that indicates the update status of that page. For example, a page may include a memory cell that stores a logic state (e.g., value) representative of the update status of the firmware code stored at that page. When the firmware code stored at the page is updated, the logic state stored at the memory cell may be changed to reflect the update. A memory device concurrently reading firmware code from pages in different planes may thus detect inconsistent firmware update statuses (e.g., different firmware versions) across the pages by comparing the "status update" flags stored in each page. If the flags are the same value, the memory device may determine that the memory pages all have the same version of firmware. If the flags are different, the memory device may determine that the memory pages have different versions of firmware. Thus, a memory device may implement a firmware version detection scheme by toggling a bit representing the update status of a page each time the page is updated with new firmware.

Upon detecting that memory pages have different versions of firmware the memory device may switch from the parallel retrieval method to the serial retrieval method. For example, if the memory device determines that the firmware code (e.g., subset 3) in page 4 of plane 3 is a different version than the firmware code in page 8 of planes 0, 1, and 2, the memory device may read the rest of the firmware stored in plane 0 starting with page 7 (e.g., set 3). The memory device may select plane 0 for the serial retrieval method based on the copy stored in plane 0 being an old version of the firmware. Alternatively, the memory device may reduce the number of planes involved in the parallel retrieval method (as opposed to switching to the serial retrieval method). For example, the memory device may omit plane 3 from subsequent rounds of parallel read operations. Thus, the memory device may perform a round of parallel read operations on the pages with the page address for page 7 in memory planes 0, 1 and 2.

Although use of a flag (e.g., a single bit) to indicate the update status of a page may be efficient compared to other a firmware version detection schemes, such a scheme may require extra care to ensure that the flag is consistently different between copies during a firmware update. For example, a memory device may accidentally load different versions of firmware from two pages because the flags in those pages happen to be the same value (e.g., because one page has been updated twice more than the other). Accordingly, a memory device may improve robustness and increase detection reliability by using multiple memory cells (e.g., a field) in each page to store an indication of the version of firmware stored in that page. Upon concurrently reading firmware code from multiple pages in multi-plane mode, the memory device may compare the firmware version associated with each page before loading the firmware into cache memory. If the firmware versions are different, the memory device may discard the firmware code and switch to single plane mode. If the firmware versions are the same, the memory device may load the firmware into the cache memory and continue in multi-plane mode.

In some examples, a memory device operating in multi-plane mode may determine that a page is associated with an error. For example, after reading subset 3 from page 4 of plane 3, the memory device may determine that subset 3 has an error. The memory device may detect the error using error correction codes, which may be included in the parity data 415 stored in page 4. Upon detecting the error, the memory device may discard the data read from page 4 of plane 3 and read subset 3 from one of the pages in another plane. For example, the memory device may read subset 3 from page 7 of plane 0, or page 6 of plane 1, or page 5 of plane 2. The memory device may then resume the parallel retrieval method starting with page 8. Alternatively, the memory device may switch to the serial retrieval method (e.g., if the memory device determines that a quantity of errors has been exceeded).

Although described with respect to memory planes, the techniques described herein can be implemented at the memory block-level or extended to any other hierarchical level or architecture. Additionally, the techniques described herein can be implemented for any type of data stored in memory.

Figure 5:
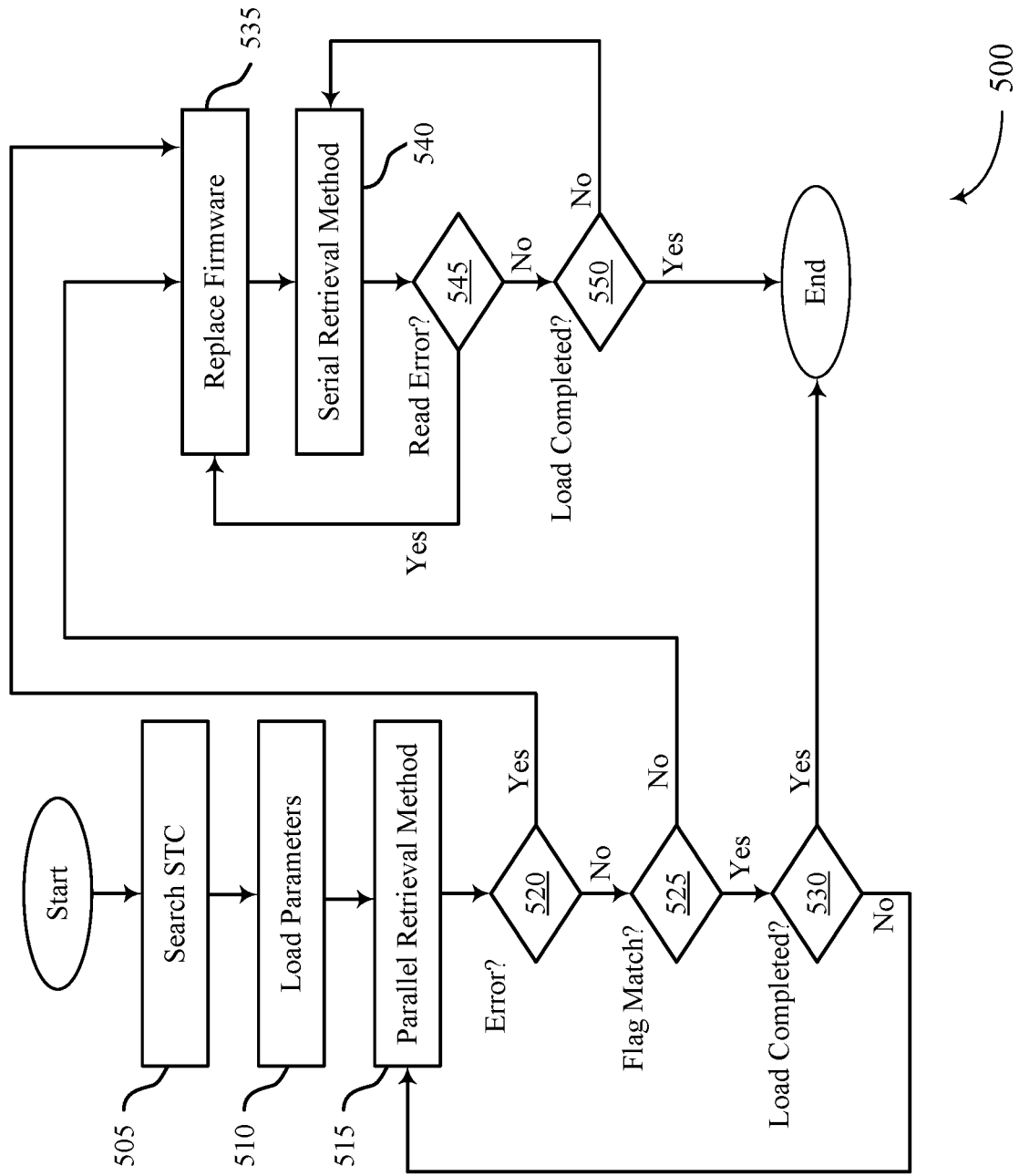
FIG. 5 illustrates an example of a process flow that supports firmware loading for a memory controller in accordance with examples as disclosed herein.

FIG. 5 illustrates an example of a process flow 500 that supports firmware loading for a memory controller in accordance with examples as disclosed herein. Aspects of process flow 500 may be implemented by a memory device or controller as described herein.

At 505, the memory device may search for a starting code in memory (e.g., NAND memory). After finding the starting code, the memory device may, at 510, load memory parameters (e.g., memory geometry, memory layout, number of planes per die, number of dies per device, etc.) from the starting code so that the memory can be searched for firmware code. At 515, the memory device may perform a parallel retrieval method on a first set of memory planes in accordance with the techniques described herein. At 520, the memory device may determine whether there in an error in a subset of firmware code read from a memory plane. If the memory device detects an error, the memory device may discard the subset of firmware code and, at 535, read a replacement (e.g., error-free) subset of firmware from a different memory plane. The memory device may then switch to using a serial retrieval method at 540. Alternatively, the memory device may reduce the quantity of planes read during the parallel retrieval method and start the process over at 515. Reducing the quantity of planes read during the parallel retrieval method may include omitting one or more of the planes from subsequent concurrent read operations.

If at 520 the memory device does not detect an error, the memory device may check the update status flag for each page read at 525. For example, the memory device may compare (e.g., using a sense amplifier) the value (e.g., logic state) of each status flag (e.g., bit). If the values of the status update flags are determined to be the same at 525, the memory device may proceed to 530 as described below. If the values of the status flags are determined to be different at 525, the memory device may determine that the pages have different update statuses (e.g., different versions of firmware code). Accordingly, the memory device may, at discard the subset of firmware code with the wrong version and, at 535, read a replacement (e.g., correct-version) subset of firmware from a different memory plane. The memory device may then switch to using the serial retrieval method at 540. Alternatively, the memory device may reduce the quantity of planes read during the parallel retrieval method and start the process over at 515.

After reading an additional subset of firmware code using the serial retrieval method at 540 (or after reading additional subsets of firmware code using the reduced parallel retrieval method), the memory device may check for errors in the additional subset(s) of firmware data at 545. If an error is detected, the memory device may, at 535, replace the firmware code with the error with an error-free firmware code by reading a different memory plane. If an error is not detected, the memory device may, at 550, determine whether the set of firmware code (e.g., a complete copy) has been loaded into the memory cache. If the set of firmware code has not been loaded (e.g., at least one subset of the firmware code is missing), the memory device may continue the parallel retrieval method at 515. If the set of firmware code has been loaded, the memory device may end the parallel retrieval method and execute the firmware code.

Figure 6:
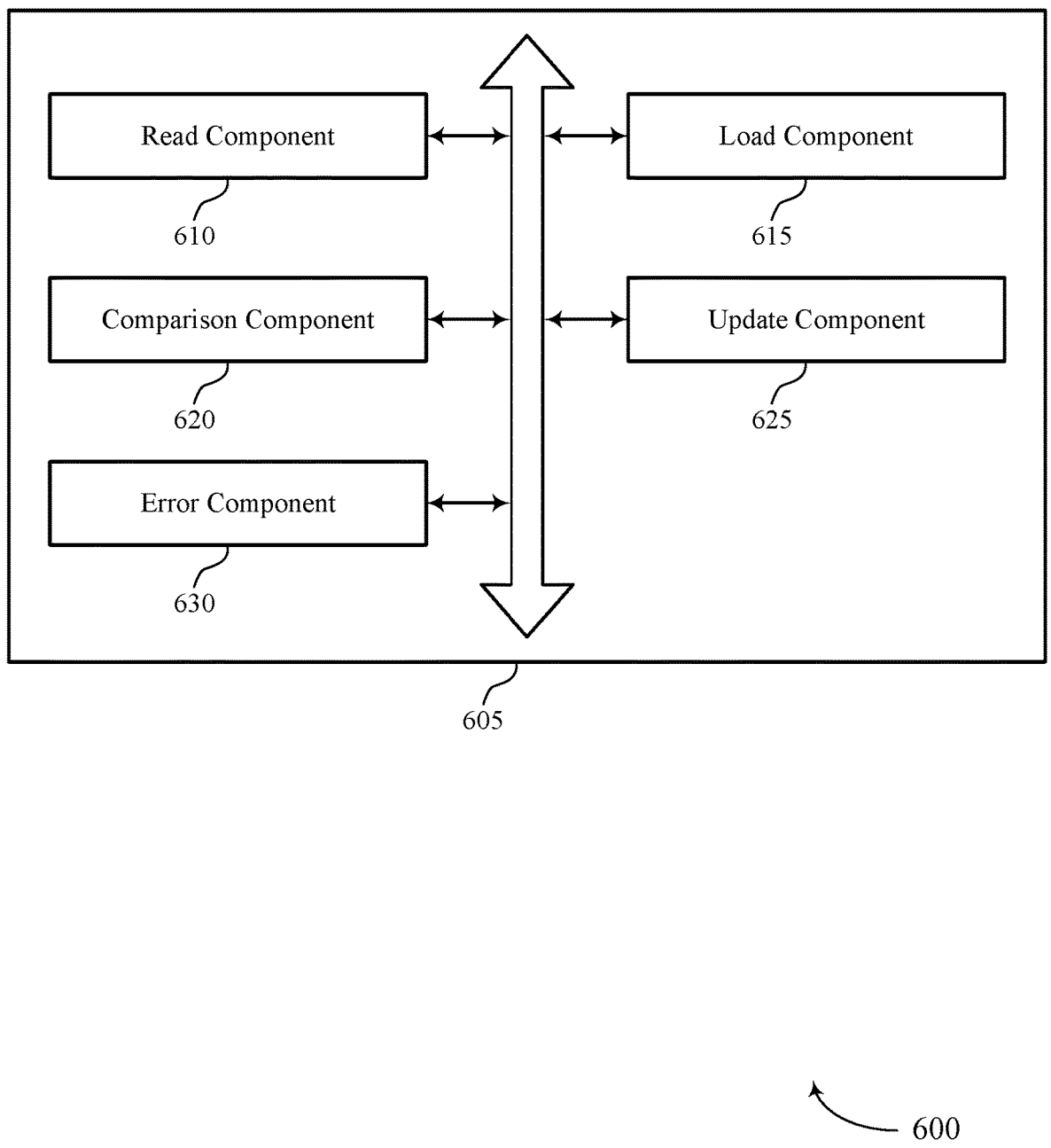
FIG. 6 illustrates an example of a block diagram that supports firmware loading for a memory controller in accordance with examples as disclosed herein.

FIG. 6 shows a block diagram 600 of a memory device 605 that supports firmware loading for a memory controller in accordance with examples as disclosed herein. The memory device 605 may be an example of aspects of a memory device as described with reference to FIG. 1. The memory device 605 may include a read component 610, a load component 615, a comparison component 620, an update component 625, and an error component 630. Each of these modules may communicate, directly or indirectly, with one another (e.g., via one or more buses or other conductive connections).

The read component 610 may read a first subset of a set of firmware code from a first page of memory. The first page may have a first page address and be within a first plane of a memory device. And the first plane may store a first copy of the set of firmware code. The read component 610 may read, concurrent with reading the first subset of the set of firmware code, a second subset of the set of firmware code from a second page of memory. The second page may have the first page address and may be within a second plane of the memory device. And the second plane may store a second copy of the set of firmware code. The load component 615 may load the first subset of the set of firmware code, the second subset of the set of firmware code, or both, into cache memory for execution by a controller of the memory device. In some examples, the first and second planes share circuitry for decoding page addresses. In some examples, the first and second planes are within a same memory die.

The comparison component 620 may compare a first bit stored in the first page with a second bit stored in the second page. The first bit may be representative of a firmware update status associated with the first page and the second bit may be representative of a firmware update status associated with the second page. In some examples, the comparison component 620 may determine that the first bit and the second bit have a same value. In such examples, the read component 610 may read, based at least in part on the first and second bits having the same value, additional subsets of the set of firmware code concurrently from additional pages of memory within the first and second planes, the additional pages each having a second page address. In some examples, the comparison component 620 may determine that the first bit and the second bit have different values. In such examples, the read component 610 may read, based at least in part on the first and second bits having different values, additional subsets of the set of firmware code from additional pages of memory within the first plane, the additional pages having different page addresses. Additionally, the update component 625 may determine, based at least in part on the second bit, that the second subset of the set of firmware code has been updated. Accordingly, the load component 615 may discard the second subset of the set of firmware code based at least in part on determining that the second subset of the set of firmware code has been updated.

In some examples, the update component 625 may update the first subset of the set of firmware code stored in the first page of the first plane. The update component 625 may also change a value of the first bit stored in the first page of the first plane based at least in part on updating the first subset of the set of firmware code.

In some examples, the error component 630 may detect an error associated with the second subset of the set of firmware code stored in the second page. In such examples, the read component 610 may read, based at least in part on detecting the error, a copy of the second subset of the set of firmware code from a third page of memory that is within the first plane and has a second page address.

In some examples, the read component 610 may read a third subset of the set of firmware code from a third page of memory that is within the first plane and has a second page address. The read component 610 may also read, concurrent with reading the third subset of the set of firmware code, a fourth subset of the set of firmware code from a fourth page of memory that is within the second plane and has the second page address.

In some examples, the read component 610 may read, concurrent with reading the first and second subsets of the set of firmware code, a third subset of the set of firmware code from a third page of memory that is within a third plane and has the first page address. The third plane may store a third copy of the set of firmware code. In some examples, the update component 625 may determine that the third subset of the set of firmware code has a different update status than the first and second subsets of the set of firmware code. In such cases, the read component 610 may omit, based at least in part on the determination, the third plane from a subsequent set of concurrent read operations performed on pages within the first and second planes.

In some examples, the update component 625 may update a first copy of firmware stored in a first memory plane by writing a new version of the firmware to a first plurality of sequentially addressed pages within the first memory plane, the first plurality of sequentially addressed pages starting with a first page address. The update component 625 may also update a second copy of the firmware stored in a second memory plane by writing the new version of the firmware to a second plurality of sequentially addressed pages within the second memory plane, the second plurality of sequentially addressed pages starting with a second page address that is offset from the first page address. In some examples, updating the first copy of the firmware may include writing a first subset of the firmware (e.g., subset 0) to a page with the first page address (e.g., page 1) within the first memory plane (e.g., plane 3 of firmware layout 400-*b*), and writing a second subset of the firmware (e.g., subset 1) to a page with the second page address (e.g., page 2) within the first memory plane (e.g., plane 3 of firmware layout 400-*b*). In some examples, updating the second copy of the firmware may include writing the first subset of the firmware (e.g., subset 0) to a page with the second page address (e.g., page 2) within the second memory plane (e.g., memory plane 2 of firmware layout 400-*b*), and writing the second subset of the firmware (e.g., subset 1) to a page with a third page address (e.g., page 3) within the second memory plane (e.g., memory plane 3 of firmware layout 400-*b*).

In some examples, the update component 625 may change a value of a first bit stored in a first page with the first page address based at least in part on updating the first copy of the firmware, the first bit representative of an update status of the first memory page. In some examples, the update component 625 may change a value of a second bit stored in second page with the second page address based at least in part on updating the second copy of the firmware, the second bit representative of an update status of the second page.

Figure 7:
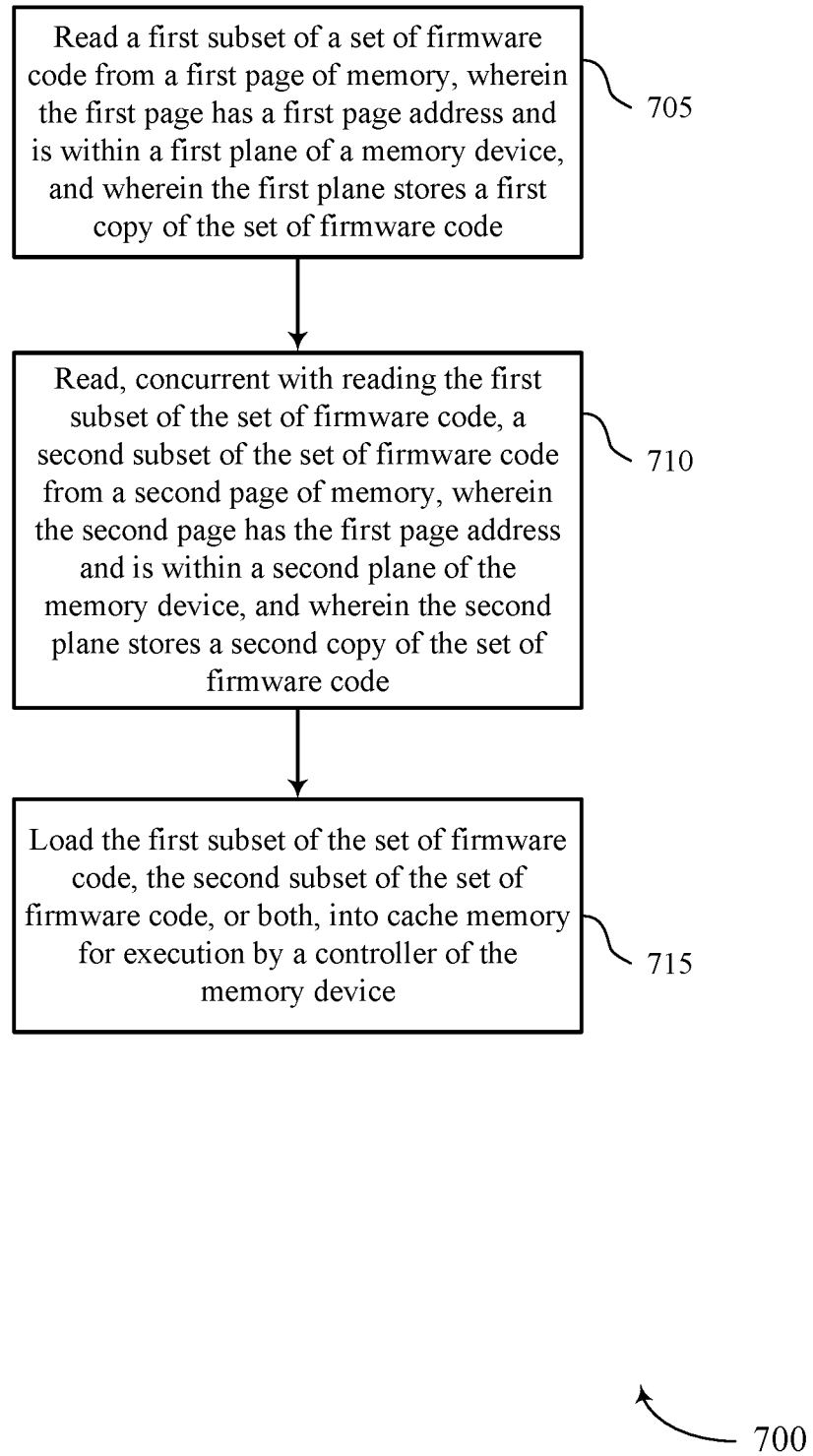
FIGS. 7 and 8 show flowcharts illustrating a method or methods that support firmware loading for a memory controller in accordance with examples as disclosed herein.

FIG. 7 shows a flowchart illustrating a method or methods 700 that supports firmware loading for a memory controller in accordance with examples as disclosed herein. The operations of method 700 may be implemented by a memory device or its components as described herein. For example, the operations of method 700 may be performed by a memory device as described with reference to FIGS. 1 and 6. In some examples, a memory device may execute a set of instructions to control the functional elements of the memory device to perform the described functions. Additionally or alternatively, a memory device may perform aspects of the described functions using special-purpose hardware.

At 705, the method may include reading a first subset of a set of firmware code from a first page of memory, where the first page has a first page address and is within a first plane of a memory device, and where the first plane stores a first copy of the set of firmware code. The operations of 705 may be performed according to the methods described herein. In some examples, aspects of the operations of 705 may be performed by a read component as described with reference to FIG. 6.

At 710, the method may include reading, concurrent with reading the first subset of the set of firmware code, a second subset of the set of firmware code from a second page of memory, where the second page has the first page address and is within a second plane of the memory device, and where the second plane stores a second copy of the set of firmware code. The operations of 710 may be performed according to the methods described herein. In some examples, aspects of the operations of 710 may be performed by a read component as described with reference to FIG. 6.

At 715, the method may include loading the first subset of the set of firmware code, the second subset of the set of firmware code, or both, into cache memory for execution by a controller of the memory device. The operations of 715 may be performed according to the methods described herein. In some examples, aspects of the operations of 715 may be performed by a load component as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for reading a first subset of a set of firmware code from a first page of memory, where the first page has a first page address and is within a first plane of a memory device, and where the first plane stores a first copy of the set of firmware code; reading, concurrent with reading the first subset of the set of firmware code, a second subset of the set of firmware code from a second page of memory, where the second page has the first page address and is within a second plane of the memory device, and where the second plane stores a second copy of the set of firmware code; and loading the first subset of the set of firmware code, the second subset of the set of firmware code, or both, into cache memory for execution by a controller of the memory device.

Some examples of the method 700 and the apparatus described herein may further include operations, features, means, or instructions for comparing a first bit stored in the first page with a second bit stored in the second page, the first bit representative of a firmware update status associated with the first page and the second bit representative of a firmware update status associated with the second page. Some examples of the method 700 and the apparatus described herein may further include operations, features, means, or instructions for determining that the first bit and the second bit have a same value and reading, based at least in part on the first and second bits having the same value, additional subsets of the set of firmware code concurrently from additional pages of memory within the first and second planes, the additional pages each having a second page address.

Some examples of the method 700 and the apparatus described herein may further include operations, features, means, or instructions for determining that the first bit and the second bit have different values and reading, based at least in part on the first and second bits having different values, additional subsets of the set of firmware code from additional pages of memory within the first plane, the additional pages having different page addresses. Some examples of the method 700 and the apparatus described herein may further include operations, features, means, or instructions for determining, based at least in part on the second bit, that the second subset of the set of firmware code has been updated and discarding the second subset of the set of firmware code based at least in part on determining that the second subset of the set of firmware code has been updated.

Some examples of the method 700 and the apparatus described herein may further include operations, features, means, or instructions for updating the first subset of the set of firmware code stored in the first page of the first plane and changing a value of the first bit stored in the first page of the first plane based at least in part on updating the first subset of the set of firmware code.

Some examples of the method 700 and the apparatus described herein may further include operations, features, means, or instructions for reading a third subset of the set of firmware code from a third page of memory that is within the first plane and has a second page address. Some examples of the method 700 and the apparatus described herein may further include operations, features, means, or instructions for reading, concurrent with reading the third subset of the set of firmware code, a fourth subset of the set of firmware code from a fourth page of memory that is within the second plane and has the second page address.

Some examples of the method 700 and the apparatus described herein may further include operations, features, means, or instructions for reading, concurrent with reading the first and second subsets of the set of firmware code, a third subset of the set of firmware code from a third page of memory that is within a third plane and has the first page address, wherein the third plane stores a third copy of the set of firmware code. Some examples of the method 700 and the apparatus described herein may further include operations, features, means, or instructions for determining that the third subset of the set of firmware code has a different update status than the first and second subsets of the set of firmware code and omitting, based at least in part on the determination, the third plane from a subsequent set of concurrent read operations performed on pages within the first and second planes.

In some examples of the method 700 and the apparatus described herein, the first and second planes share circuitry for decoding page addresses. In some examples of the method 700 and the apparatus described herein, the first and second planes are within a same memory die.

Figure 8:
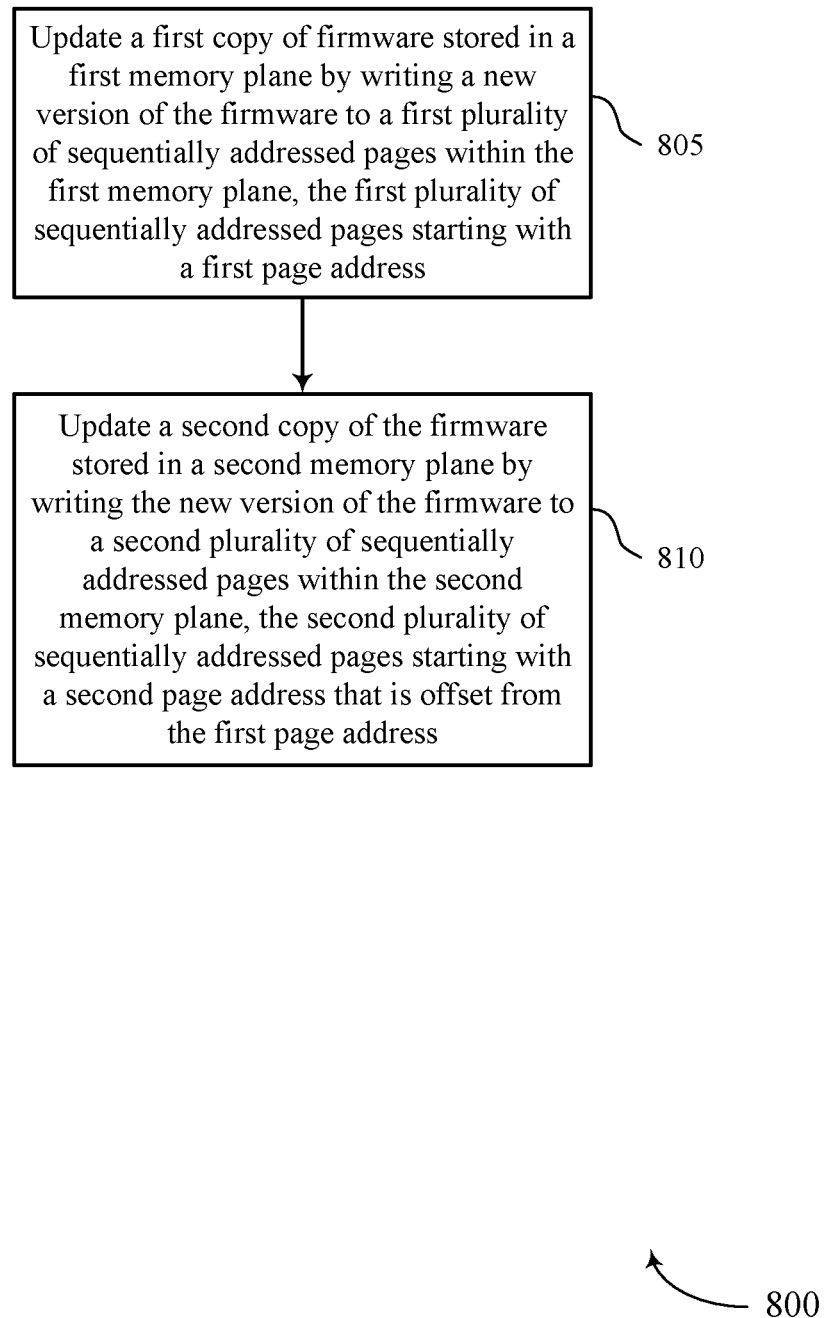

FIG. 8 shows a flowchart illustrating a method or methods 800 that supports firmware loading for a memory controller in accordance with examples as disclosed herein. The operations of method 800 may be implemented by a memory device or its components as described herein. For example, the operations of method 800 may be performed by a memory device as described with reference to FIGS. 1 and 6. In some examples, a memory device may execute a set of instructions to control the functional elements of the memory device to perform the described functions. Additionally or alternatively, a memory device may perform aspects of the described functions using special-purpose hardware.

At 805, the method may include updating a first copy of firmware stored in a first memory plane by writing a new version of the firmware to a first plurality of sequentially addressed pages within the first memory plane, the first plurality of sequentially addressed pages starting with a first page address. The operations of 805 may be performed according to the methods described herein. In some examples, aspects of the operations of 805 may be performed by an update component as described with reference to FIG. 6.

At 810, the method may include updating a second copy of the firmware stored in a second memory plane by writing the new version of the firmware to a second plurality of sequentially addressed pages within the second memory plane, the second plurality of sequentially addressed pages starting with a second page address that is offset from the first page address. The operations of 810 may be performed according to the methods described herein. In some examples, aspects of the operations of 810 may be performed by an update component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for updating a first copy of firmware stored in a first memory plane by writing a new version of the firmware to a first plurality of sequentially addressed pages within the first memory plane, the first plurality of sequentially addressed pages starting with a first page address; and updating a second copy of the firmware stored in a second memory plane by writing the new version of the firmware to a second plurality of sequentially addressed pages within the second memory plane, the second plurality of sequentially addressed pages starting with a second page address that is offset from the first page address.

Some examples of the method 800 and the apparatus described herein may further include operations, features, means, or instructions for changing a value of a first bit stored in a first page with the first page address based at least in part on updating the first copy of the firmware, the first bit representative of an update status of the first page. Some examples of the method 800 and the apparatus described herein may further include operations, features, means, or instructions for changing a value of a second bit stored in second page with the second page address based at least in part on updating the second copy of the firmware, the second bit representative of an update status of the second page.

Some examples of the method 800 and the apparatus described herein may further include operations, features, means, or instructions for writing a first subset of the firmware to a page with the first page address within the first memory plane. Some examples of the method 800 and the apparatus described herein may further include operations, features, means, or instructions for writing a second subset of the firmware to a page with the second page address within the first memory plane. Some examples of the method 800 and the apparatus described herein may further include operations, features, means, or instructions for writing the first subset of the firmware to a page with the second page address within the second memory plane. Some examples of the method 800 and the apparatus described herein may further include operations, features, means, or instructions for writing the second subset of the firmware to a page with a third page address within the second memory plane. In some examples, updating the second copy of the firmware occurs after updating the first copy.

In some examples, an apparatus as described herein may perform a method or methods, such as the method 700 or the method 800. The apparatus may include a first memory plane operable to store a first copy of a set of firmware code; a second memory plane operable to store a second copy of the set of firmware code; and a controller coupled with the first memory plane and the second memory plane. The controller may be operable to initiate a first read operation to read a first subset of the set of firmware code from a first page with a first page address, wherein the first page is within the first memory plane; initiate a second read operation to read, concurrent with the first read operation, a second subset of the set of firmware code from a second page with the first page address, where the second page is within the second memory plane; and execute the first subset of the set of firmware code based at least in part on the first read operation, the second subset of the set of firmware code based at least in part on the second read operation, or both. A controller may be operable to perform an operation if the controller is programmed with instructions that, when executed, cause the controller to perform the operation.

In some examples, the controller may be operable to determine that the first subset and the second subset of the set of firmware code have different update statuses. And the controller may be operable to initiate, based at least in part on the determination, a plurality of serial read operations to read additional subsets of the set of firmware code from a plurality of pages in the first memory plane.

In some examples, the controller may be operable to determine that the first subset and the second subset of the set of firmware code have matching update statuses. And the controller may be operable to initiate, based at least in part on the determination, a plurality of concurrent read operations to read additional subsets of the set of firmware code from pages in the first and second memory planes.

In some examples, the controller may be operable to initiate a first plurality of erase and write operations to update the first copy of the set of firmware code, the first plurality of write operations starting with the first page address. And the controller may be operable to initiate a second plurality of erase and write operations to update the second copy of the set of firmware code, the second plurality of write operations starting with a second page address. In some examples, the first plurality of write operations are operable to change, in each page of the first memory plane, at least one logic value representing an update status for a respective subset of the set of firmware code. In some examples, the second plurality of write operations are operable to change, in each page of the second memory plane, at least one logic value representing an update status for a respective subset of the set of firmware code. In some examples, different subsets of the set of firmware code are written to memory cells associated with the first page address and memory cells associated with the second page address.

In some examples, the controller is operable to initiate a third read operation to read a third subset of the set of firmware code from a third page with a second page address, wherein the third page is within the first memory plan. And the controller may be operable to initiate a fourth read operation to read, concurrent with the third read operation, a fourth subset of the set of firmware code from a fourth page with the second page address, wherein the fourth page is within the second memory plane.

In some examples, the apparatus may include a third memory plane operable to store a third copy of the set of firmware code. In such examples, the controller may be operable to initiate a third read operation to read, concurrent with the first and second read operations, a third subset of the set of firmware code from a third page with the first page address, wherein the third page is within the third memory plane. And the controller may be operable to execute the third subset of the set of firmware code based at least in part on the third read operation.

In some examples, the apparatus may include circuitry operable to decode page addresses for read operations, wherein the circuitry is coupled with the first memory plane and the second memory plane.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory device, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, performed by a memory device, the method comprising:
   reading a first subset of a set of firmware code from a first page of memory, wherein the first page has a first page address and is within a first plane of the memory device, and wherein the first plane stores a first copy of the set of firmware code;
   reading, concurrent with reading the first subset of the set of firmware code, a second subset of the set of firmware code from a second page of memory, the second subset different than the first subset, wherein the second page has the first page address and is within a second plane of the memory device, and wherein the second plane stores a second copy of the set of firmware code; and
   loading the first subset of the set of firmware code, the second subset of the set of firmware code, or both, into cache memory for execution by a controller of the memory device.

2. The method of claim 1, further comprising:
   comparing a first bit stored in the first page with a second bit stored in the second page, the first bit representative of a firmware update status associated with the first page and the second bit representative of a firmware update status associated with the second page.

3. The method of claim 2, further comprising:
   determining that the first bit and the second bit have a same value; and
   reading, based at least in part on the first and second bits having the same value, additional subsets of the set of firmware code concurrently from additional pages of memory within the first and second planes, the additional pages each having a second page address.

4. The method of claim 2, further comprising:
   determining that the first bit and the second bit have different values; and
   reading, based at least in part on the first and second bits having different values, additional subsets of the set of firmware code from additional pages of memory within the first plane, the additional pages having different page addresses.

5. The method of claim 4, further comprising:
   determining, based at least in part on the second bit, that the second subset of the set of firmware code has been updated; and
   discarding the second subset of the set of firmware code based at least in part on determining that the second subset of the set of firmware code has been updated.

6. The method of claim 2, further comprising:
   updating the first subset of the set of firmware code stored in the first page of the first plane; and
   changing a value of the first bit stored in the first page of the first plane based at least in part on updating the first subset of the set of firmware code.

7. The method of claim 1, further comprising:
   detecting an error associated with the second subset of the set of firmware code stored in the second page; and
   reading, based at least in part on detecting the error, a copy of the second subset of the set of firmware code from a third page of memory that is within the first plane and has a second page address.

8. The method of claim 1, further comprising:
   reading a third subset of the set of firmware code from a third page of memory that is within the first plane and has a second page address; and
   reading, concurrent with reading the third subset of the set of firmware code, a fourth subset of the set of firmware code from a fourth page of memory that is within the second plane and has the second page address.

9. The method of claim 1, further comprising:
   reading, concurrent with reading the first and second subsets of the set of firmware code, a third subset of the set of firmware code from a third page of memory that is within a third plane and has the first page address, wherein the third plane stores a third copy of the set of firmware code.

10. The method of claim 9, further comprising:
    determining that the third subset of the set of firmware code has a different update status than the first and second subsets of the set of firmware code; and
    omitting, based at least in part on the determination, the third plane from a subsequent set of concurrent read operations performed on pages within the first and second planes.

11. The method of claim 1, wherein the first and second planes share circuitry for decoding page addresses.

12. The method of claim 1, wherein the first and second planes are within a same memory die.

13. An apparatus, comprising:
    a first memory plane operable to store a first copy of a set of firmware code;
    a second memory plane operable to store a second copy of the set of firmware code; and
    a controller coupled with the first memory plane and the second memory plane, the controller operable to:
      initiate a first read operation to read a first subset of the set of firmware code from a first page with a first page address, wherein the first page is within the first memory plane;
      initiate a second read operation to read, concurrent with the first read operation, a second subset of the set of firmware code from a second page with the first page address, the second subset different than the first subset, wherein the second page is within the second memory plane; and
      execute the first subset of the set of firmware code based at least in part on the first read operation, the second subset of the set of firmware code based at least in part on the second read operation, or both.

14. The apparatus of claim 13, wherein the controller is further operable to:
    determine that the first subset and the second subset of the set of firmware code have different update statuses; and
    initiate, based at least in part on the determination, a plurality of serial read operations to read additional subsets of the set of firmware code from a plurality of pages in the first memory plane.

15. The apparatus of claim 13, wherein the controller is further operable to:
    determine that the first subset and the second subset of the set of firmware code have matching update statuses; and
    initiate, based at least in part on the determination, a plurality of concurrent read operations to read additional subsets of the set of firmware code from pages in the first and second memory planes.

16. The apparatus of claim 13, wherein the controller is further operable to:

initiate a first plurality of erase operations and a first plurality of write operations to update the first copy of the set of firmware code, the first plurality of write operations starting with the first page address; and initiate a second plurality of erase operations and a second plurality of write operations to update the second copy of the set of firmware code, the second plurality of write operations starting with a second page address.

17. The apparatus of claim 16, wherein the first plurality of write operations are operable to change, in each page of the first memory plane, at least one logic value representing an update status for a respective subset of the set of firmware code; and wherein the second plurality of write operations are operable to change, in each page of the second memory plane, at least one logic value representing an update status for a respective subset of the set of firmware code.

18. The apparatus of claim 16, wherein different subsets of the set of firmware code are written to memory cells associated with the first page address and memory cells associated with the second page address.

19. The apparatus of claim 13, wherein the controller is further operable to:

initiate a third read operation to read a third subset of the set of firmware code from a third page with a second page address, wherein the third page is within the first memory plane; and initiate a fourth read operation to read, concurrent with the third read operation, a fourth subset of the set of firmware code from a fourth page with the second page address, wherein the fourth page is within the second memory plane.

20. The apparatus of claim 13, further comprising:

a third memory plane operable to store a third copy of the set of firmware code, wherein the controller is further operable to:

initiate a third read operation to read, concurrent with the first and second read operations, a third subset of the set of firmware code from a third page with the first page address, wherein the third page is within the third memory plane; and execute the third subset of the set of firmware code based at least in part on the third read operation.

21. The apparatus of claim 13, further comprising:

circuitry operable to decode page addresses for read operations, wherein the circuitry is coupled with the first memory plane and the second memory plane.

22. An apparatus, comprising:

a first memory plane of a memory device;

a second memory plane of the memory device; and a controller coupled with the first memory plane and the second memory plane, the controller operable to:

update a first copy of firmware stored in the first memory plane by writing a new version of the firmware to a first plurality of sequentially addressed pages within the first memory plane, the first plurality of sequentially addressed pages starting with a first page address; and update a second copy of the firmware stored in a second memory plane by writing the new version of the firmware to a second plurality of sequentially addressed pages within the second memory plane, the second plurality of sequentially addressed pages starting with a second page address that is offset from the first page address, wherein different subsets of the firmware within the first copy of the firmware and the second copy of the firmware have a common pace address and are operable to be concurrently read from each of the first memory plane and the second memory plane based at least in part on the offset.

23. The apparatus of claim 22, wherein the controller is further operable to:

change a value of a first bit stored in a first page with the first page address based at least in part on updating the first copy of the firmware, the first bit representative of an update status of the first page; and change a value of a second bit stored in second page with the second page address based at least in part on updating the second copy of the firmware, the second bit representative of an update status of the second page.

24. The apparatus of claim 22, wherein the controller is operable to update the first copy of the firmware based at least in part on:

writing a first subset of the firmware to a page with the first page address within the first memory plane; and writing a second subset of the firmware to a page with the second page address within the first memory plane.

25. The apparatus of claim 24, wherein the controller is operable to update the second copy of the firmware after updating the first copy, and wherein the controller is operable to update the second copy of the firmware based at least in part on:

writing the first subset of the firmware to a page with the second page address within the second memory plane; and writing the second subset of the firmware to a page with a third page address within the second memory plane.

\* \* \* \* \*